UNITED STATES PATENT OFFICE.

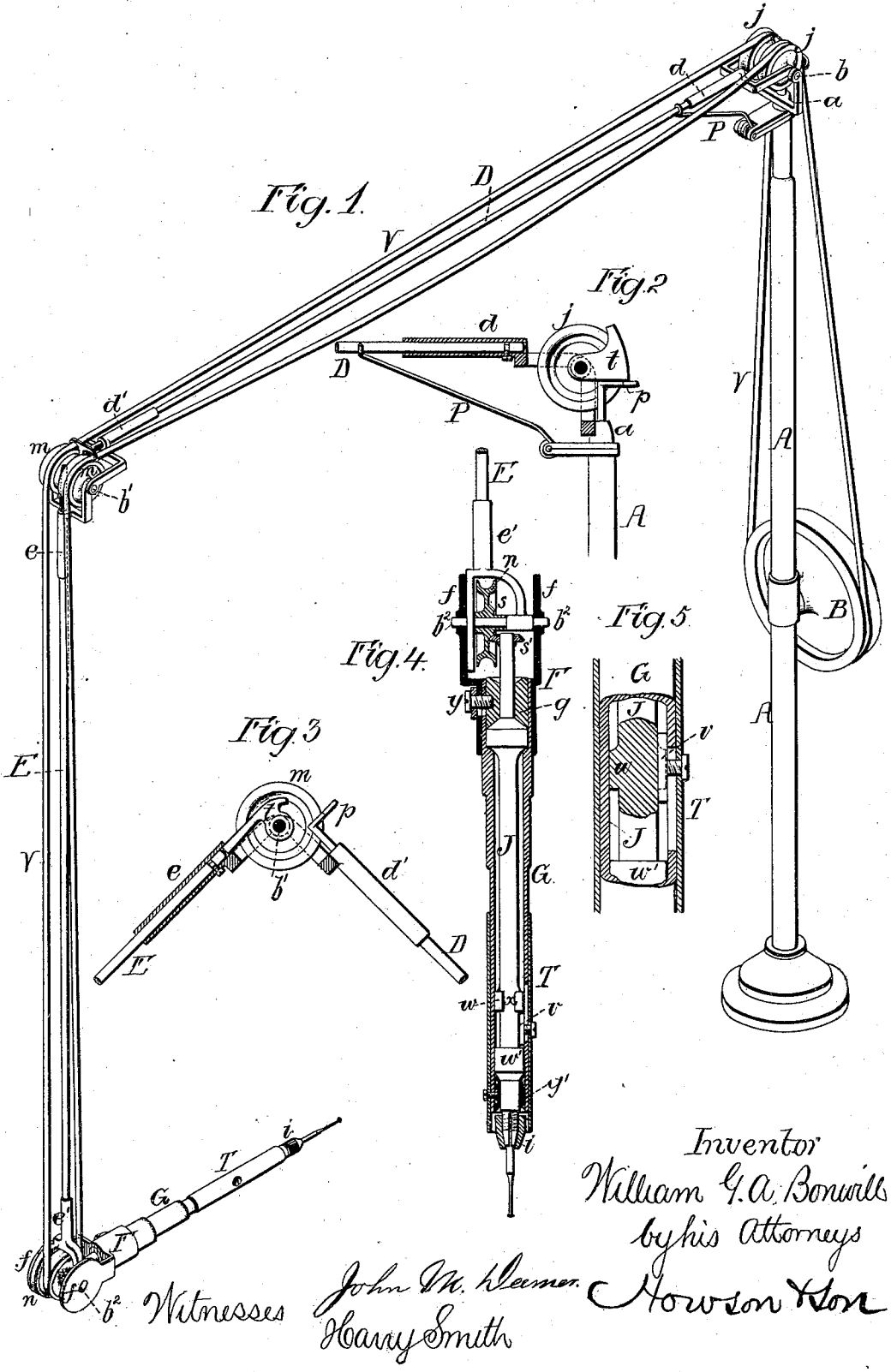

WILLIAM G. A. BONWILL, OF PHILADELPHIA, PENNSYLVANIA.

IMPROVEMENT IN DENTAL ENGINES.

Specification forming part of Letters Patent No. 199,779, dated January 29, 1878; application filed December 17, 1877.

*To all whom it may concern:*

Be it known that I, WILLIAM G. A. BONWILL, of Philadelphia, Pennsylvania, have invented a new and useful Improvement in Universal Connections for the Driving Devices of Dental and other Tools, of which the following is a specification:

My invention relates to certain improvements especially applicable to dental drills or lathes; the main object of my invention being to transmit the motion of the driving-shaft to the operating-shaft of the drill or lathe, in such a manner that the latter may be adjusted to any desired position without interfering with the proper working of the driving appliances; further objects being to provide for the instant stoppage of the operating-shaft of the drill or lathe, to permit the employment, in connection therewith, of a universal tool-holding chuck, and to provide for the effects of wear on the shaft.

These objects I attain in the following manner, reference being had to the accompanying drawings, in which—

Figure 1 is a perspective view of my improvement applied to a drilling implement, such as is used in dental operations, a portion of the operating-belt being drawn to one side in order to illustrate the frame. Figs. 2 and 3 are sectional views of joints in the frame; Fig. 4, a sectional view of the hand-piece which carries the operating-shaft of the drill; and Fig. 5, a sectional view of a portion of the same.

A is a standard, provided with a suitable base or foundation, and carrying, in the present instance, the bearing of the wheel B, to which power is applied from a treadle, or in any other suitable manner. To the upper end of the standard A is adapted a stem, $a$, having a forked upper end, adapted to the opposite ends of a transverse shaft, $b$, to which is also adapted the forked end of a socket, $d$, secured to, but capable of turning on, the inner end of a rod, D, the outer end of said rod carrying a similar socket, $d'$, the forked end of which is adapted to a transverse shaft, $b'$.

E is a rod, similar to the rod D, being provided at the inner end with a forked socket, $e$, adapted to the transverse shaft $b^1$, and at the outer end with a similar forked socket, $e'$, adapted to the transverse shaft $b^2$, the ends of the latter being secured to wings $f$ on a socket, F, attached to the upper end of a tubular stem, G, which is of such a size and shape that it can be easily grasped by the hand.

Extending longitudinally through the stem G is the operating-shaft J, which has collars adapted to bearings $g$ $g'$ in the stem G, and is provided at the lower end with a universal chuck, $i$, for securing tools to the shaft.

The shaft $b$ carries two loose pulleys, $j$ $j$, and the shaft $b^1$ two similar pulleys, $m$ $m$, while on the shaft $b^2$ turns a pulley, $n$, on the inner face of which is secured a bevel-wheel, $s$, which gears into a bevel-pinion, $s'$, secured to the upper end of the shaft J.

The driving-belt V passes round the pulley B, over the pulleys $j$ and $m$, and round the pulley $n$, the pulleys $j$ and $m$ being merely idler-pulleys, to sustain and guide the belt.

The universal adjustability of the above device will be understood when it is observed that it is an almost exact reproduction of the human arm, so far as regards the range of movement possible, the pivoted stem $a$ and shaft $b$ forming the shoulder-joint, the rod D the upper bone of the arm, the shaft $b^1$ the elbow-joint, the rod E the bone of the fore-arm, and the shaft $b^2$ the wrist-joint, the turning of the bars D and E on their own axes being permitted by the manner in which they are connected to the sockets at each end.

In order to support the weight of the rods D and E and their connections, and prevent the same from incommoding the operator, I attach to a lug on the stem $a$ a spring-arm, P, the outer hooked end of which is adapted to the arm D.

Both the forked stem $a$ and forked socket $d'$ carry recessed plates $p$, which act as guides for the belt V; and hung loosely to each of the shafts $b$ $b^1$ is a segmental plate, $t$, which serves as a stop to limit the backward and upward movement of the rod E or rod D.

Adapted to the outside of the tubular stem G is a movable sleeve, T, which carries a block, $v$, the latter extending through an opening in the stem, and being adapted to the space between two collars, $w$ $w'$, on the operating-shaft J, as shown in Fig. 4.

The upper collar $w$ has a slot, $x$, formed in it, so that when this slot is in line with the block $v$ the latter may, by an upward movement of the sleeve T, be caused to enter the slot, and thus lock the shaft J in position, when, from the breaking of the tool or other cause, it is desirable to stop the shaft, the belt V in this case slipping on the pulley $n$.

When the device is in operation and the sleeve T depressed, as shown in Fig. 4, the lower end of said sleeve covers the hub $i$ of the universal chuck, and thus prevents the milled surface of the same from coming in contact with the gums, cheeks, or lips of the person whose teeth are being operated upon, thereby overcoming a serious objection to the use of universal chucks in implements of this class. When the sleeve is elevated, however, the hub $i$ is exposed, and can be readily manipulated by the fingers in order to release or secure the tool.

The same screw $y$ which serves to secure the socket F to the upper end of the stem G also holds in place the upper bearing-block $g$, so that by loosening said screw the bearing, when worn, may be so adjusted as to take up the slack occasioned thereby, being secured in position after adjustment by again tightening the screw. The bearing $g'$ is also adjustable, in order that the pinion $s'$ may always be kept in its proper position in relation to the bevel-wheel $s$.

It is not absolutely necessary, in carrying out my invention, that the exact construction shown should in all cases be adhered to. For instance, instead of rods provided at the ends with forked sockets, two straight bars, extending from shaft to shaft, could be employed; or the rods might be made tubular, and the belt V caused to pass through the same. The arrangement shown, however, is preferred, as it is light, and is thus capable of being made of any length without undue increase of weight.

If desired, the block $v$ may be adapted to a recess in the shaft J, and may be carried by a spring-arm instead of sliding sleeve.

In some cases the rod D may be dispensed with, and the rod E permitted to slide through a block at the joint $b$, a weight being combined with the belt V in such case, in order to keep the belt always tight as the rod is moved in or out.

The improvements shown and described are applicable to classes of machinery other than dental drills. For instance, they may be applied to dental lathes, or to the rotation of shafts generally.

I claim as my invention—

1. The combination of the forked rods, and the shafts by which they are pivoted together, with the segmental stop-plates $t$ hung to the shafts, as specified.

2. The combination of the stem G and its shaft J with the shaft $b^2$, pulley $n$, bevel-wheel $s$, and bevel-pinion $s'$, all substantially as set forth.

3. The combination of the slotted stem G and its bearing-block $g$ with the slotted socket F and the screw $y$, which serves to secure both socket and block in position, as specified.

4. The combination of the shaft J and its universal chuck $i$ with the stem G and its sliding sleeve T, all substantially as set forth.

5. The combination of the shaft J and its slotted collar $w$, and the slotted stem G, with the sliding sleeve T and its block $v$.

In testimony whereof I have signed my name to this specification in the presence of two subscribing witnesses.

W. G. A. BONWILL.

Witnesses:
  RICHARD L. GARDINER,
  HARRY SMITH.